(12) United States Patent
Lee et al.

(10) Patent No.: US 10,649,259 B2
(45) Date of Patent: May 12, 2020

(54) DISPLAY DEVICE HAVING DISPLAY PANEL FIXED RELATIVE TO OPTICAL MEMBER SOLELY BY ELASTIC FIXING MEMBER

(71) Applicant: Samsung Display Co. Ltd., Yongin-si, Gyeonggi-do (KR)

(72) Inventors: Ji Won Lee, Suwon-si (KR); Jae Sul An, Hwaseong-si (KR); Seung Beom Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 58 days.

(21) Appl. No.: 16/127,360

(22) Filed: Sep. 11, 2018

(65) Prior Publication Data

US 2019/0155089 A1 May 23, 2019

(30) Foreign Application Priority Data

Nov. 22, 2017 (KR) .......................... 10-2017-0156250

(51) Int. Cl.
*G02F 1/13357* (2006.01)
*G02F 1/1333* (2006.01)
*F21V 8/00* (2006.01)

(52) U.S. Cl.
CPC ..... *G02F 1/133308* (2013.01); *G02B 6/0088* (2013.01); *G02B 6/0038* (2013.01); *G02B 6/0053* (2013.01); *G02F 2001/133317* (2013.01)

(58) Field of Classification Search
CPC ......... G02F 1/133608; G02F 1/133615; G02F 1/133603; G02F 1/133606; G02F 2001/133607; F21V 17/00
See application file for complete search history.

(56) References Cited

U.S. PATENT DOCUMENTS

| | | | | |
|---|---|---|---|---|
| 8,827,481 | B2 * | 9/2014 | Kuroda | G02F 1/133602 348/739 |
| 10,473,848 | B2 * | 11/2019 | Bae | H01L 23/4985 |
| 2006/0050195 | A1 * | 3/2006 | Choi | G02F 1/133308 349/58 |

FOREIGN PATENT DOCUMENTS

| | | |
|---|---|---|
| KR | 101123288 B1 | 2/2012 |
| KR | 1020160064321 A | 6/2016 |
| KR | 1020170018443 A | 2/2017 |
| KR | 1020170034651 A | 3/2017 |

* cited by examiner

*Primary Examiner* — Ismael Negron
(74) *Attorney, Agent, or Firm* — Cantor Colburn LLP

(57) ABSTRACT

A display device includes a display panel, an optical member disposed under the display panel, and an elastic inter-module fixing member disposed between the display panel and the optical member and overlapping the optical member, such that the display panel is fixed with respect to the optical member solely by the friction coefficient of the fixing member.

20 Claims, 13 Drawing Sheets

DISPLAY DEVICE HAVING DISPLAY PANEL FIXED RELATIVE TO OPTICAL MEMBER SOLELY BY ELASTIC FIXING MEMBER

This application claims priority to Korean Patent Application No. 10-2017-0156250, filed Nov. 22, 2017, and all the benefits accruing therefrom under 35 U.S.C. § 119, the content of which in its entirety is hereby incorporated by reference.

BACKGROUND

1. Field

The invention relates to a display device.

2. Description of the Related Art

A liquid crystal display device largely includes a liquid crystal panel displaying an image with light and a backlight unit which is disposed under the liquid crystal panel and supplies light to the liquid crystal panel. The liquid crystal panel and the backlight unit may be fixed within the liquid crystal display device by a separate fixing member. However, a total width and thickness of the bezel of the liquid crystal display device may be undesirably increased by the volume of the fixing member included therein.

SUMMARY

One or more exemplary embodiment of the invention is to provide a slimmer display device for which a bezel is reduced while maintaining luminance uniformity.

Another exemplary embodiment of the invention is to provide a display device having enhanced durability by reinforcing a buffering function.

Additional features will be set forth in the detailed description which follows, and, in part, will be apparent from the disclosure, or may be learned by practice of the invention.

According to an exemplary embodiment, a display device includes a display panel, an optical member disposed under the display panel, and an elastic inter-module fixing member disposed between the display panel and the optical member and overlapping the optical member in a top plan view, where a friction coefficient of the inter-module fixing member with respect to each of the display panel and the optical member is larger than a friction coefficient of the display panel with respect to the optical member, to fix positions of the display panel and the optical member solely by the inter-module fixing member therebetween.

According to another exemplary embodiment, a display device includes a display panel which displays an image with light; a light guide plate through which light incident thereto is guided and from which the guided light is provided to the display panel, the light guide plate including: a light incident side surface through which the light is incident to the light guide plate, and a connecting side surface which is connected to and extends from the light incident side surface; a first optical pattern through which the guided light from the light guide plate is provided to the display panel, the first optical pattern disposed between the display panel and the light guide plate; and an inter-module fixing member disposed between the display panel and the light guide plate, where the inter-module fixing member solely by which the positions of the display panel and the optical member are fixed includes a silicon material or a rubber material.

The foregoing general description and the following detailed description are exemplary and explanatory and are intended to provide further explanation of the claimed subject matter.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
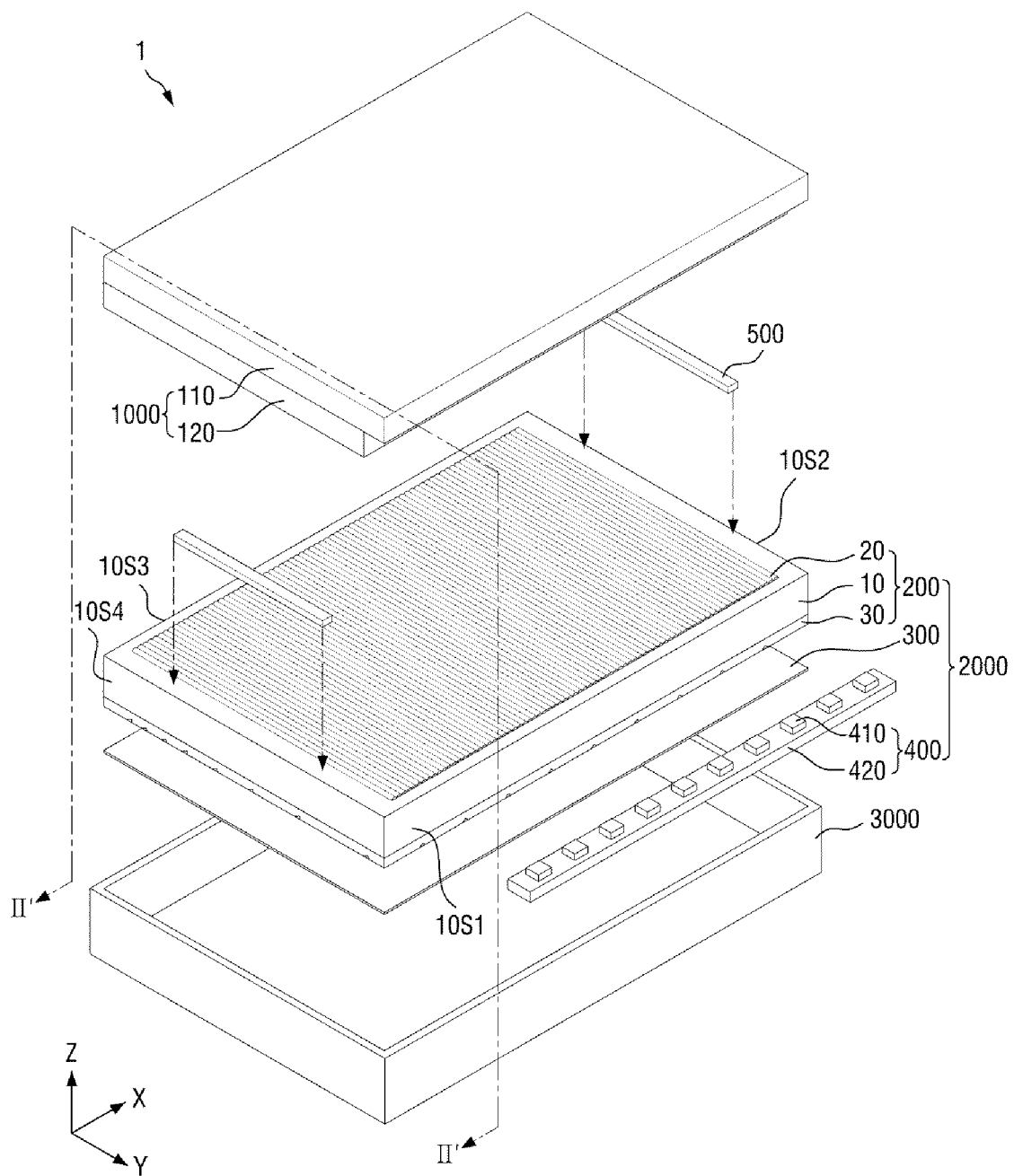
FIG. 1 is an exploded perspective view of an exemplary embodiment of a display device according to the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being related to another element such as being "on," "connected to," or "coupled to" another element, it may be directly on, connected to, or coupled to the other element or intervening elements may be present. When, however, an element is referred to as being related to another element such as being "directly on," "directly connected to," or "directly coupled to" another element, there are no intervening elements present. To this end, the term "connected" may refer to physical, electrical and/or fluid connection.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art. For example, "about" can mean within one or more standard deviations, or within ±30%, 20%, 10% or 5% of the stated value.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As used herein, the first direction X is any one direction in a plane, the second direction Y is a direction intersecting the first direction X in the plane, and the third direction Z is a direction perpendicular to the plane.

A backlight unit of a display device largely includes a light source and a light guide plate. The light guide plate receives light from the light source and guides the traveling direction of the light toward a display panel of the display device which displays an image with the guided light. A point light source such as a light-emitting diode ("LED") is generally used as the light source within the backlight unit. However, in the case of such a point light source, light is relatively widely spread and emitted, so that a direction in which the light travels within the light guide plate may become insufficient for use by the display panel. When the traveling direction of light is damaged in the light guide plate, luminance at a side surface of the light guide plate facing a light incident surface thereof may be reduced.

Hereinafter, exemplary embodiments of the invention will be described with reference to the attached drawings.

Figure 2:
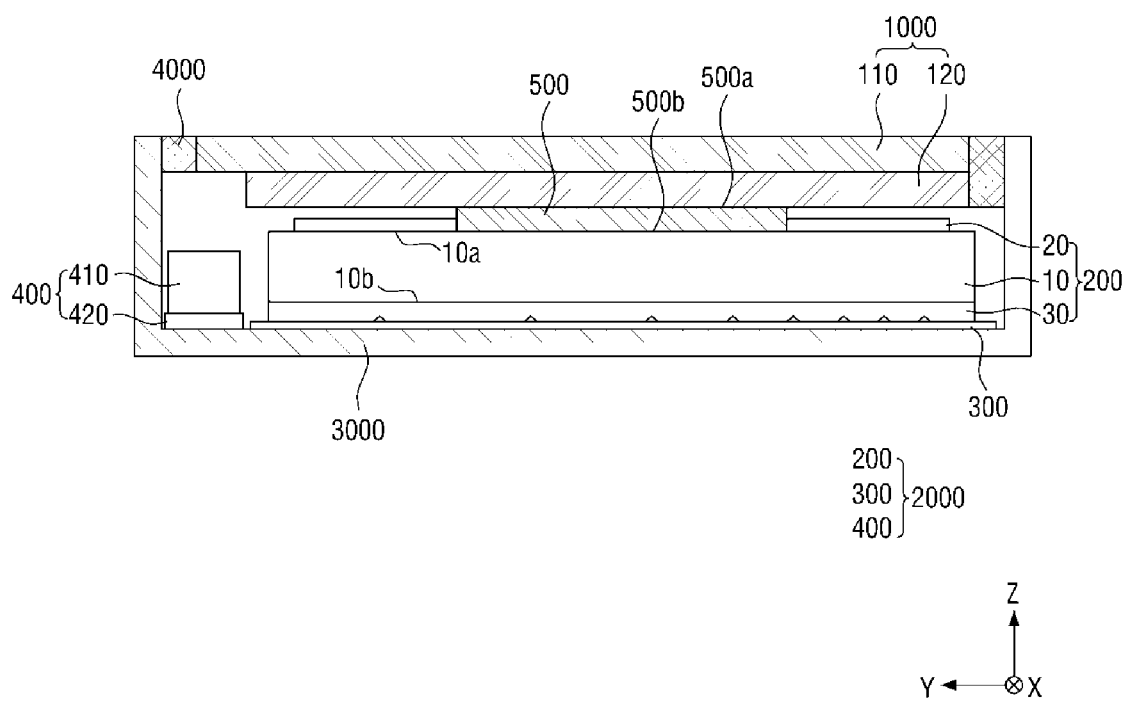
FIG. 2 is a cross-sectional view taken along line II'-II' of FIG. 1.

FIG. 1 is an exploded perspective view of an exemplary embodiment of a display device according to the invention. FIG. 2 is a cross-sectional view taken along line II'-II' of FIG. 1.

Referring to FIGS. 1 and 2, a display device 1 includes a display panel 1000 and a backlight unit 2000 which is disposed under the display panel 1000. Unless otherwise defined, as used herein, the term "upper" or "upper surface" refers to a side of a display surface or a side from which an image is viewed with respect to the display panel 1000, and the term "lower" or "lower surface" refers to a side opposite to the display surface or the viewing side with respect to the display panel 1000.

The display device 1 may have an overall rectangular shape in a top plan view. The display device 1 may include relatively long sides disposed lengthwise extending along the first direction X and relatively short sides disposed lengthwise extending along the second direction Y. The display device 1 may have a three-dimensional shape having an overall height or thickness in the third direction Z, and may have a rectangular parallelepiped shape as a whole. The display device 1 may be a flat display device or may be a curved display device which is curved with a predetermined curvature.

The display panel 1000 is a panel for displaying an image, and may be, for example, a display panel which generates and displays an image with light provided thereto such as a liquid crystal display panel. In the following exemplary embodiments, a case of the flat display device 1 including a liquid crystal display panel as the display panel 1000 is exemplified. However, the invention not limited thereto, and other types of display panels, such as self-emissive display panel which generates and emits light therein to display an image, an electro wetting display panel, an electrophoretic display panel and a micro electro mechanical system ("MEMS") display panel, may be used.

The display panel 1000 includes a first (display) substrate 120, a second (display substrate 110 facing the first substrate 120, and an optical transmittance or control layers such as a liquid crystal layer (not shown) disposed between the first substrate 120 and the second display substrate 110. The first substrate 120 and the second substrate 110 overlap each other. In an exemplary embodiment, one substrate may have a larger planar area than the other substrate, and thus may protrude further than an edge of the other substrate to be exposed therefrom.

It is shown in the drawings that the second substrate 110 located on an upper side of the display panel 1000 is larger than the first substrate 120. In an exemplary embodiment, for example, the second substrate 110 may protrude further than an outer edge of the first substrate 120 at a side where a light source unit 400 is disposed. The protruding area of the second substrate 110 which is disposed outside edges of the first substrate 120 may provide an area or space at which a drive chip and/or an external circuit board is mounted. Unlike the exemplary embodiment illustrated in FIGS. 1 and 2, the first substrate 120 disposed on a lower side of the display panel may be larger than the second substrate 110, and thus may protrude outward from an outer edge of the second substrate 110. One or more edge of a planar area where the first substrate 120 and the second substrate 110 overlap with each other in the display panel 1000, except for the protruding area of the larger substrate, may be substantially aligned with a side surface of a light guide plate 10 to be described later.

The backlight unit 2000 is disposed under the display panel 1000. The backlight unit 2000 generates and provides light to the display panel 1000. That is, the display panel 1000 receives light from the backlight unit 2000 and displays an image using the light.

The backlight unit 2000 includes an optical member 200 and the light source unit 400. The optical member 200 may include the light guide plate 10, a first optical pattern (layer) 20 disposed at an upper surface 10*a* of the light guide plate 10, and a second optical pattern (layer) 30 disposed at a lower surface 10*b* of the light guide plate 10. The light guide plate 10, the first optical pattern 20 and the second optical pattern 30 may be integrally coupled with each other. A portion of one of the light guide plate 10, the first optical pattern 20 and the second optical pattern 30 may be extended or protruded to define one or more of the other of the first optical pattern 20 and the second optical pattern 30.

The light guide plate 10 serves to guide a travelling path of light incident to the light guide plate 10. The light guide plate 10 may have an overall substantially polygonal columnar shape. The planar shape of the light guide plate 10 may be rectangular, but is not limited thereto. In an exemplary embodiment, the light guide plate 10 has a rectangular parallelepiped shape whose planar shape is rectangular, and may include or define the upper surface 10*a*, the lower surface 10*b*, and four side surfaces 10S1, 10S2, 10S3 and 10S4 which each connect the upper and lower surfaces 10*a* and 10*b* to each other. In this specification and the accompanying drawings, when it is necessary to separately define these side surfaces, they are represented by "10S1", "10S2", "10S3" and "10S4", but, in the case of simply defining a side surface, it is represented by "10S".

In an exemplary embodiment, each of the upper surface 10*a* and lower surface 10*b* of the light guide plate 10 is located in one plane, and the plane in which the upper surface 10*a* is located and the plane in which the lower surface 10*b* is located are substantially parallel to each other, so that the entire light guide plate 10 may have a uniform thickness along the third direction Z. However, the invention is not limited thereto, and the upper surface 10*a* or the lower surface 10*b* of the light guide plate 10 may be defined or formed by portions disposed in a plurality of planes, or the plane in which the upper surface 10*a* is located and the plane in which the lower surface 10*b* is located may intersect each other.

The light guide plate 10 may include an inorganic material. In an exemplary embodiment, for example, the light guide plate 100 may include or be made of glass, but the invention is not limited thereto.

In one exemplary embodiment of the optical member 2000, the light source unit 400 may be disposed adjacent to at least one side surface 10S of the light guide plate 10. In FIGS. 1 and 2, there is exemplified a case where a plurality of point light sources such as LED light sources mounted on a printed circuit board is disposed at the side surface 10S1 located at one of the relatively long sides of the light guide plate 10, but the invention is not limited thereto.

In an exemplary embodiment, for example, a plurality of light source units 400 may be respectively disposed adjacent to side surfaces 10S1 and 10S3 as relatively long sides facing each other, or may be disposed adjacent to one or both of the side surface 10S2 or 10S4 as relatively short sides.

In the exemplary embodiment of FIG. 1, the side surface 10S1 as one of two relatively long sides of the light guide plate 10 disposed adjacent to the light source unit 400 is defined as a light incident surface 10S1 (represented by '10S1' for convenience of explanation in the drawings) to which light of the light source unit 400 is applied either directly or through a light-conversion or light-transmitting member (not shown). The side surface 10S3 at the other of the relatively long sides, facing the light incident surface, is defined as a light-facing surface (represented by '10S3' for convenience of explanation in the drawings).

The first optical pattern 20 may be disposed at, in or on the upper surface 10*a* of the light guide plate 10. The first optical pattern 20 induces light incident into the light guide plate 10 to travel in a straight or linear direction toward a light-facing surface, thereby improving the light collecting efficiency of the light guide plate 10. Specifically, the first optical pattern 20 refracts light traveling toward both side surfaces 10S2 and 10S4 on the right and left of the light incident surface 10S1 toward the light-facing surface 10S3, so that a relatively larger amount of light can travel toward the light-facing surface 10S3.

In an exemplary embodiment, the first optical pattern 20 may include a lenticular pattern provided in plurality each lengthwise extending continuously from the light incident surface 10S1 toward the light-facing surface 10S3, that is, along the second direction Y. The lenticular pattern may extend from an edge of the light guide plate 10 at the light incident surface 10S1 to an edge of the light guide plate 10 at the light-facing surface 10S3, without being limited thereto. In this case, the path of the light incident into the light guide plate 10 and guided therein may be adjusted such that this light is refracted and/or reflected at the interface between a lenticular pattern and an air layer to travel toward the light-facing surface 10S3. However, the shape of the first optical pattern 20 is not limited thereto, and various shapes may be applied as long as light collecting efficiency can be improved.

The first optical pattern 20 may be provided as a separate layer or pattern relative to a body of the light guide plate 10. In an exemplary embodiment, for example, the first optical pattern 20 may be disposed or formed by an imprinting method in which a resin material is applied on the upper surface 10a of the light guide plate 10 and a pattern is formed using a stamper to define the first optical pattern 20 on the body of the light guide plate 10. In this case, the first optical pattern 20 and the light guide plate 10 do not require a separate adhesive member.

However, the invention is not limited thereto, and the first optical pattern 20 may be defined or formed by a portion or shape of the upper surface 10a of the overall light guide plate 10. A portion of the light guide plate 10 between the upper and lower surfaces 10a and 10b may define the main body of the light guide plate 10. In an exemplary embodiment, for example, a portion of a main body may extend from a plane of the upper surface 10a to define a lenticular pattern at the upper surface 10a of the light guide plate 10 where the lenticular pattern functions as an optical pattern. In an exemplary embodiment, a recess may be defined recessed from the upper surface 10a of the light guide plate 10 to define an optical pattern.

Figure 12A:
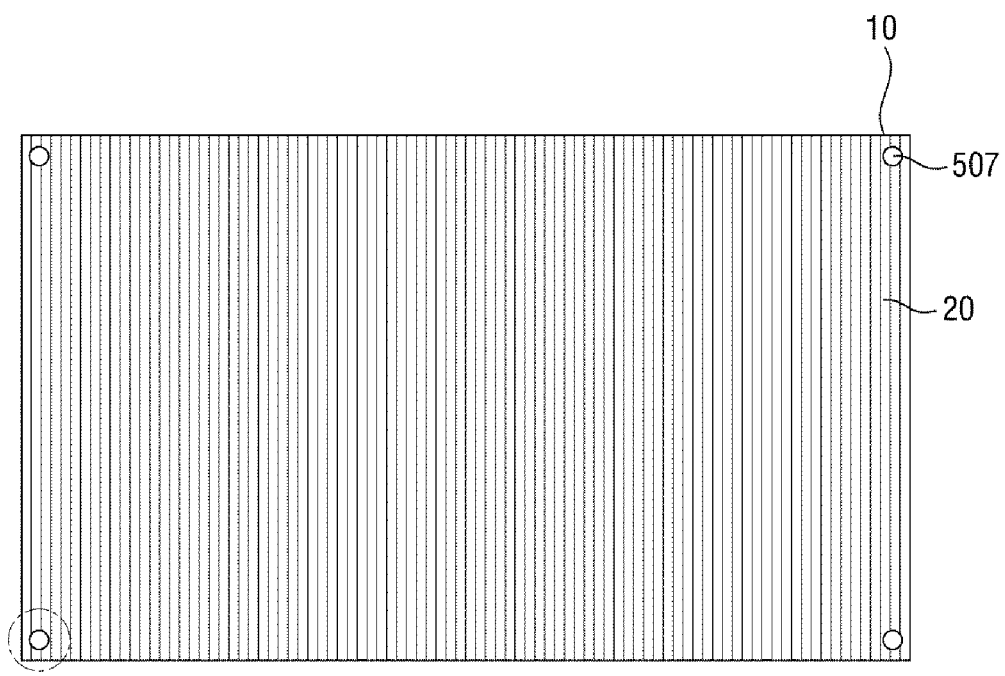
FIGS. 12A and 12B are top plan views of yet another exemplary embodiment of an inter-module fixing member of a display device, according to the invention.
Figure 12B:
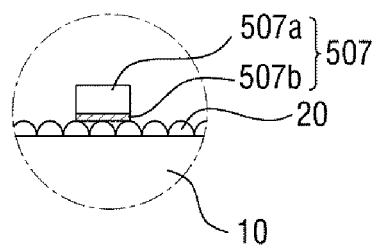

Referring to FIGS. 1 and 2, the first optical pattern 20 covers or is disposed at most of the upper surface 10a of the light guide plate 10, but is spaced apart from outer edges of the light guide plate 10 to expose an edge portion of the light guide plate 10 at one or more sides thereof. In other words, a portion of the upper surface 10a at the side surface 10S of the light guide plate 10 may be exposed from the first optical pattern 20 since an edge of the first optical pattern 20 is not aligned with the side surface 10S of the light guide plate 10. The portion of the upper surface 10a of the light guide plate 10 which is exposed from the first optical pattern 20, provides an area or a space at which an inter-module fixing member 500 is disposed. However, the invention is not limited thereto, and, as shown in FIGS. 12A and 12B, one or more edge of the first optical pattern 20 may be substantially aligned with the side surface of the light guide plate 10.

The refractive index of the first optical pattern 20 may be similar to or higher than the refractive index of the light guide plate 10. In an exemplary embodiment, for example, when the light guide plate 10 includes or is made of glass having a refractive index of about 1.5, the refractive index of the first optical pattern 20 may be about 1.5 to about 1.8, but is not limited thereto. In an exemplary embodiment, the refractive index of the first optical pattern 20 may be about 1.53 or about 1.58.

When the refractive index of the first optical pattern 20 is similar to the refractive index of the light guide plate 10, the interface between the upper surface 10a of the light guide plate 10 and the first optical pattern 20 is not recognized as an optical interface. Thus, the light can travel between a main body of the light guide plate 10 to the first optical pattern 20 at the interface therebetween since the main body and the first optical pattern 20 function as one integrated light guide plate member. When the refractive index of the first optical pattern 20 is higher than the refractive index of the light guide plate 10, the first optical pattern 20 and an air layer can form an effective optical interface, and thus the light collecting efficiency by the first optical pattern 20 can increase.

The second optical pattern 30 may be disposed at the lower surface 10b of the light guide plate 10. In an exemplary embodiment, the second optical pattern 30 may be a light-scattering pattern. The second optical pattern 30 serves to change the traveling angle of light traveling within in the light guide plate 10 by total reflection such that the light from within the light guide plate 10 is emitted to outside the light guide plate 10 through a light-emitting surface thereof. The upper surface 10a of the light guide plate 10 which faces the display panel 1000 may define the light-emitting surface of the light guide plate 10. The second optical pattern 30 may be, for example, an inverse prism pattern. However, the invention is not limited thereto, and the shape of the second optical pattern 30 is not limited as long as it can perform a scattering function.

The density of a plurality of individual patterns defining the second optical pattern 30 may be changed depending on a total planar area of the display device 1 or components thereof. In an exemplary embodiment, for example, the layout density of a plurality of the inverse prism patterns may be made relatively small in the area adjacent to the light incident surface 10S1 where light quantity is relatively large, and the layout density of the inverse prism patterns may be made relatively large in the area adjacent to the light-facing surface 10S3 (e.g., furthest from the light incident surface 10S1) where light quantity is relatively small.

The second optical pattern 30, similarly to the first optical pattern 20, may be provided at a separate layer or pattern relative to the body of the light guide plate 10, or may be defined by a portion or shape of the lower surface 10b of the overall the light guide plate 10.

The second optical pattern 30 may cover or define the entire lower surface 10b of the light guide plate 10. In other words, an outer edge of the second optical pattern 30 may be substantially aligned with the side surfaces 10S of the light guide plate 10.

Since the first optical pattern 20 and the second optical pattern 30 perform the function of an optical sheet, a separate optical sheet of a conventional backlight unit may be omitted. However, the invention is not limited thereto, and may further include an optical sheet separate from the light guide plate structure (10+20+30) as required.

The display device 1 may generally include a display area at which an image is displayed with light and a non-display area at which the image is not displayed. A bezel may include an entirety of or a portion of the non-display area of a display device 1. In an exemplary embodiment, a bezel area may include a remaining planar area of the display device 1 except for a planar area of the display panel 1000 without being limited thereto.

As described above, the light source unit 400 is disposed at one side of the light guide plate 10 of the optical member 200. The light source unit 400 may be disposed adjacent to the light incident surface 10S1 of the light guide plate 10 of the optical member 200. The light source unit 400 may include a point light source and/or a linear light source. The point light source 410 may be a light-emitting diode ("LED") light source. The plurality of LED light sources may be mounted on a printed circuit board 420.

In an exemplary embodiment, the LED light source 410 may be a side light-emitting LED that emits light laterally such as in the second direction Y, as shown in FIG. 1. In this case, the printed circuit board 420 may be disposed on the bottom surface of a housing 3000 in which the display panel 1000 and the backlight unit 2000 are received. Although not shown in the drawing, the LED light source 410 may be a top light-emitting LED that emits light upward from a light-emitting surface opposite to the printed circuit board 420. In this case, the printed circuit board 420 may be disposed on the side wall of the housing 3000 to oppose the light incident surface 10S1 with the LED light source 420 therebetween.

The backlight unit 2000 may further include a reflective member 300 disposed under the optical member 200. The reflective member 300 may include a reflective film and/or a reflective coating layer on a main body. The reflective member 300 reflects the light emitted through the lower surface 10b of the light guide plate 10 of the optical member 200 and allows the reflected light to re-enter the inside of the light guide plate 10 again via the lower surface 10b.

The optical member 200 may be coupled with the display panel 1000 through the inter-module fixing member 500. That is, the inter-module fixing member 500 is disposed between the optical member 200 and the display panel 1000. Details of the inter-module fixing member 500 will be described with reference to FIG. 3.

Figure 3:
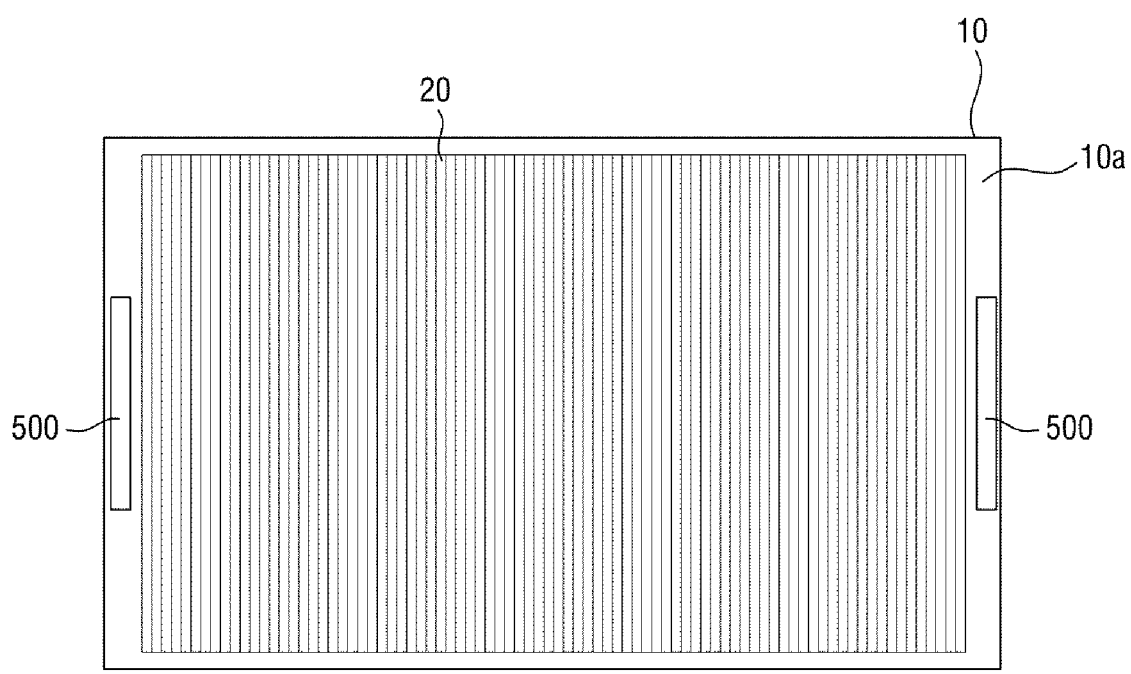
FIG. 3 is a top plan view illustrating a relationship between an optical member and inter-module fixing members of a display device, according to the invention.

FIG. 3 is a top plan view illustrating an exemplary embodiment of a relationship of an optical member and an inter-module fixing member within a display device, according to the invention.

Referring to FIG. 3, the inter-module fixing member 500 may be provided in plurality respectively located at opposing edges of the display panel 1000 and the optical member 200. In an exemplary embodiment, for example, the inter-module fixing member 500 may be disposed adjacent to each of the side surfaces 10S2, 10S3 and 10S4 except for the light incident surface 10S1 of the light guide plate 10. Although it is shown in FIG. 3 that the inter-module fixing members 500 are disposed adjacent to only the relatively short sides 10S2 and 10S4 of the light guide plate 10 since the light incident surface corresponds to a relatively long side (10S1 or 10S3 in FIG. 1), when the light incident surface of the light guide plate 10 corresponds to a relatively short side, the inter-module fixing member 500 may be disposed adjacent to one or more of the relatively long sides 10S1 and 10S3 of the light guide plate 10. The inter-module fixing member 500 adjacent to the light incident surface 10S1 of the light guide plate 10 is omitted, thereby reducing or effectively preventing a light leakage phenomenon at the side surfaces except for the light incident surface.

In general, an amount of light emitted from the upper surface 10a of the light guide plate 10 may differ for each planar area of the light guide plate along the upper surface 10a. That is, since the amount of light traveling around or adjacent to the light incident surface 10S1 is abundant, the light emission amount therearound may be larger than that in other areas of the light guide plate 10 further than the light incident surface 10S1.

Further, as will be described later, the refractive index of the inter-module fixing member 500 may be similar to that of the first optical member 200, and may have a refractive index larger than that of an air layer. Accordingly, when the inter-module fixing member 500 is disposed around the light incident surface 10S1 of the light guide plate 10, the critical angle of the upper surface 10a of the light guide plate 10 is larger than that of the air layer, so that the light emission amount around the light incident surface 10S1 may further increase. The inter-module fixing member 500 may be disposed in the vicinity of one or more edge of the light guide plate 10 in consideration of the light guiding function of the light guide plate 10 and the direct influence on the path of light.

The inter-module fixing member 500 may be disposed or formed in a hexahedral shape having a predetermined thickness in the third direction Z with a rectangular shape in a top plan view (e.g., along a plane defined by the first and second directions X and Y). The inter-module fixing member 500 is a discrete member having a three-dimensional shape. In an exemplary embodiment, for example, the inter-module fixing member 500 may have a rectangular parallelepiped shape in which relatively long sides are disposed lengthwise extended in the second direction Y. However, the shape of the inter-module fixing member 500 is not limited thereto, and various shapes of the inter-module fixing member 500 will be described with reference to FIGS. 4 to 12.

The lower surface 500b (refer to FIG. 2) of the inter-module fixing member 500 is disposed on and facing the upper surface 10a of the light guide plate 10. The inter-module fixing member 500 may be disposed so as not to overlap the first optical pattern 20. That is, the inter-module fixing member 500 may be disposed on a portion of the upper surface 10a of the light guide plate, the portion of the upper surface 10a thereof being exposed outside the first optical pattern 20.

The inter-module fixing member 500 may be disposed so as to overlap the light guide plate 10 in a top plan view. That is, the inter-module fixing member 500 may not protrude from the side surface of the light guide plate 10 and may not be extended further than an outer edge of the light guide plate 10. Since the layout of the inter-module fixing member 500 is restricted within the range occupied by the overall optical member 200 in a top plan view, an unnecessary bezel area for the inter-module fixing member 500 may be reduced in the display device 1.

Referring to FIG. 3, in one exemplary embodiment, a bezel of the display device may include a remaining planar area of the display device 1 except for a planar area of the display panel 1000. In this case, the bezel may include a planar area occupied by the side wall of the housing 3000 and the housing coupling member 4000, in the top plan view.

Referring again to FIG. 3, in another exemplary embodiment, a bezel of the display device may include a remaining planar area of the display device 1 or except for a planar area of the optical member 200. That is, when the inter-module fixing member 500 protrudes beyond the planar area occupied by the overall optical member 200 in a top plan view, the display device 1 becomes relatively larger by the range occupied by the inter-module fixing member 500, so that the bezel of the display device 1 may increase. In contrast, according to one or more exemplary embodiment of the invention, the inter-module fixing member 500 is disposed to overlap the optical member 200 in the top plan view, so that an increase in an unnecessary bezel area can be reduced or effectively prevented.

The minimum thickness of the inter-module fixing member 500 may be larger than the maximum thickness of the first optical pattern 20, along the third direction Z. The inter-module fixing member 500 can reduce or effectively prevent direct contacts of the first optical pattern 20 of the optical member 200 with the display panel 1000. When the first optical pattern 20 is in direct contact with the display panel 1000, cracks may easily occur, and a splitting phenomenon of the display panel 1000 and/or the optical member 200 may occur due to friction therebetween. In one or more exemplary embodiment of the invention, the inter-module fixing member 500 reduces or effectively prevents direct contact of the optical member 200 and the display panel 1000 with each other so as to reduce or effectively prevent damage to the optical member 200 and the display panel 1000 by impact that may occur between the optical member 200 and the display panel 1000.

The inter-module fixing member 500 may include or be made of a material having an elastic force of a predetermined level or more, and a relatively high friction coefficient. In an exemplary embodiment, for example, the inter-module fixing member 500 may include or be made of a silicon material, a rubber material or the like. The friction coefficient of the inter-module fixing member 500 may be higher than the friction coefficient of the light guide plate 10 and/or the display panel 1000. That is, the friction force acting between the light guide plate 10 and the inter-module fixing member 500 or the friction force acting between the inter-module fixing member 500 and the display panel 1000 may be greater than the static friction force between the light guide plate 10 and the display panel 1000.

The inter-module fixing member 500 can solely fix the display panel 1000 and the light guide plate 10 relative to each other only by the friction respectively between these components. That is, when the surface frictional force of the inter-module fixing member 500 is relatively high, the light guide plate 10 and the display panel 1000 may be fixed relative to each other and to other components of the display device 1 without an adhesive member. In other words, the inter-module fixing member 500 itself does not have an adhesive force, and may fix the light guide plate 10 and the display panel 1000 relative to each other or relative to other components of the display device 1 without a separate adhesive member. That is, the sliding of the light guide plate 10 and the display panel 1000 along directions which define a plane (e.g., first and second directions X and Y) can be reduced or effectively prevented and positions of the light guide plate 10 and the display panel 1000 can be fixed relative to each other and to other components of the display device 1 by using only the frictional force between the lower surface 500b of the inter-module fixing member 500 and the upper surface 10a of the light guide plate 10 and between the upper surface 500a of the inter-module fixing member 500 and the lower surface of the display panel 1000. In this case, the inter-module fixing member 500 may be in direct contact respectively with the upper surface 10a of the light guide plate 10 and the lower surface of the display panel 1000.

Further, the inter-module fixing member 500 can perform a buffering function for absorbing an external impact applied to the display device 1. When an external impact is applied to the inter-module fixing member 500 through other components of the display device 1, the shape of the inter-module fixing member 500 may be partially deformed by absorbing the external impact, and then restored to its original shape by an elastic force.

The inter-module fixing member 500 may be transparent without including a specific color. Further, the inter-module fixing member 500 may have a refractive index similar to that of the first optical pattern 20. In this case, the influence on the path of light emitted from the optical member 200 toward the display panel 1000 can be minimized. Specifically, the inter-module fixing member 500 is located between the optical member 2000 and the display panel 1000, and is thus located along the path of light from the optical member 200 toward the display panel 1000.

If the inter-module fixing member 500 has a specific color or a refractive index different from that of the first optical pattern 20, the inter-module fixing member 500 can absorb light of a specific wavelength or change the path of light. That is, the light is non-uniform at the place where the inter-module fixing member 500 is disposed, and can be recognized as a dark portion on the display panel 1000. In contrast, in one or more exemplary embodiment of the invention, when the inter-module fixing member 500 is transparent and has a refractive index similar to that of the first optical pattern 20, the light emitted from the optical member 200 can be generally incident on the display panel 1000 through the inter-module fixing member 500 without interference therefrom. Accordingly, it is possible to reduce or effectively prevent the difference in brightness due to the inter-module fixing member 500 from appearing on the display panel 1000.

Referring to FIGS. 1 and 2 again, the display device 1 may further include the housing 3000. The housing 3000 is open at one side (e.g., towards the viewing side), and includes a bottom portion and a side wall which is connected to the bottom portion. The side wall may include portions thereof lengthwise extended along sides of the display device 1. The display panel 1000 and the backlight unit 2000 may be accommodated in a space defined by the bottom portion and the side wall. The light source 400, the reflective member 300 and the optical member 200 are disposed on the bottom portion of the housing 3000. A minimum height of the side wall of the housing 3000 along the third direction Z may be substantially equal to a maximum or total height of the backlight unit 2000 and the display panel 1000 which are each placed inside the housing 3000. The display panel 1000 is disposed adjacent to the upper end of the side wall of the housing 3000, and the display panel 1000 and the housing 3000 may be coupled to each other by a housing coupling member 4000. The housing coupling member 4000 may have a rectangular frame shape in a plane view, so as to surround the display panel 1000 accommodated within the side wall of the housing 3000. The housing coupling member 4000 may include a polymer resin, an adhesive tape, or the like.

Hereinafter, other exemplary embodiments relating to the inter-module fixing member will be described. In the following exemplary embodiments, a description of the same components as those of the previously described exemplary embodiment will be omitted or simplified, and differences will be mainly described.

Figure 4:
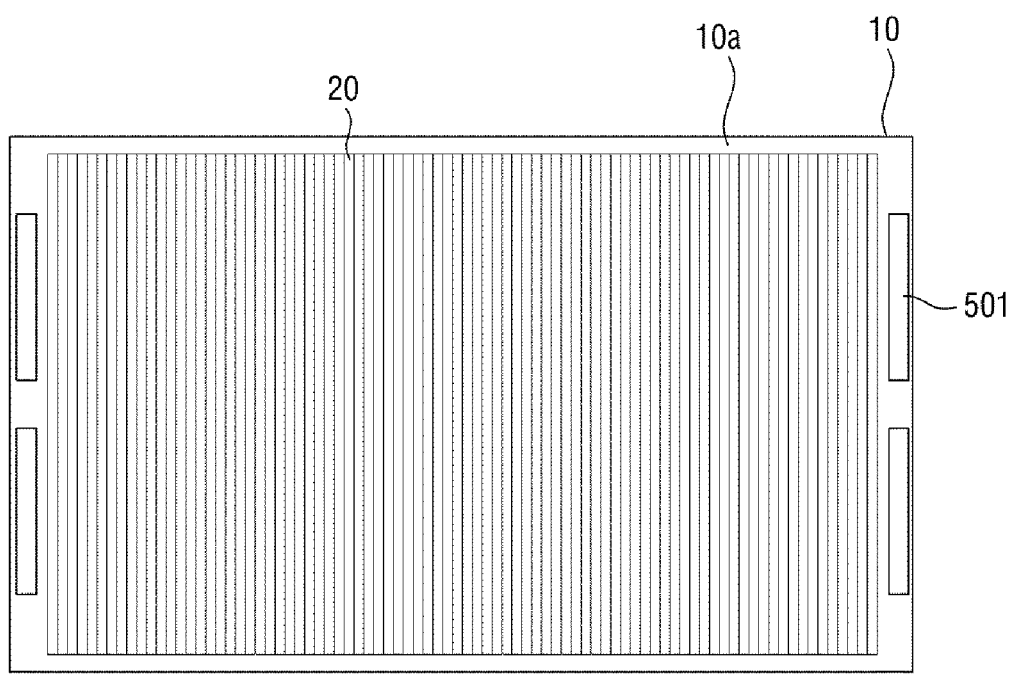
FIGS. 4 to 6 are top plan views of modifications of the relationship between an optical member and inter-module fixing members of a display device, according to the invention.
Figure 4:
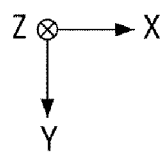
Figure 5:
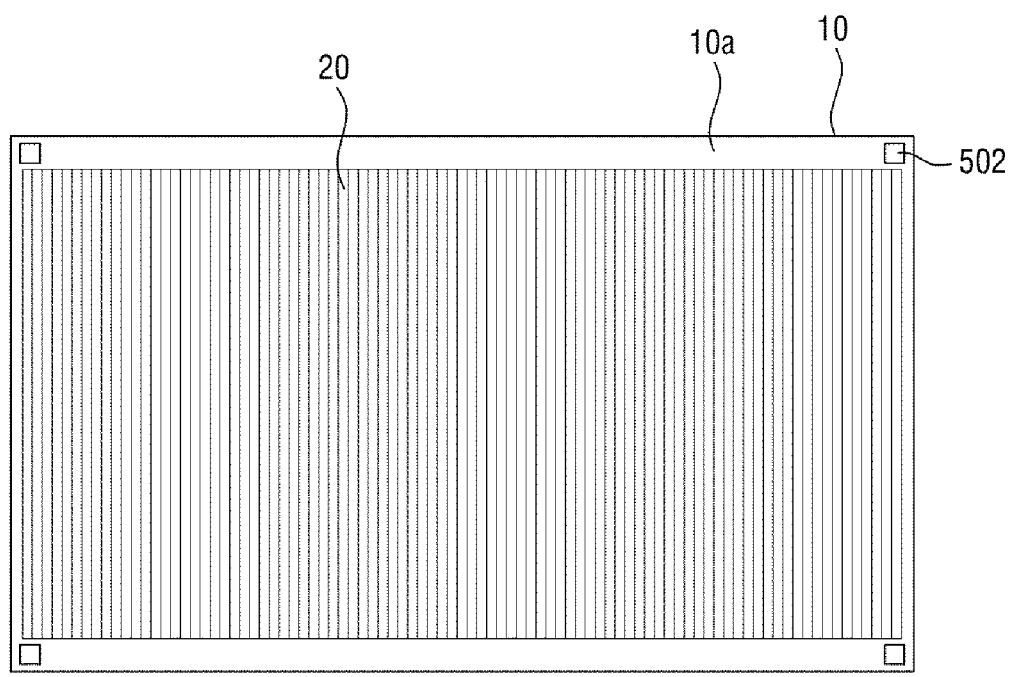
Figure 5:
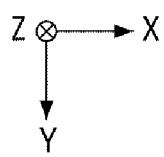
Figure 6:
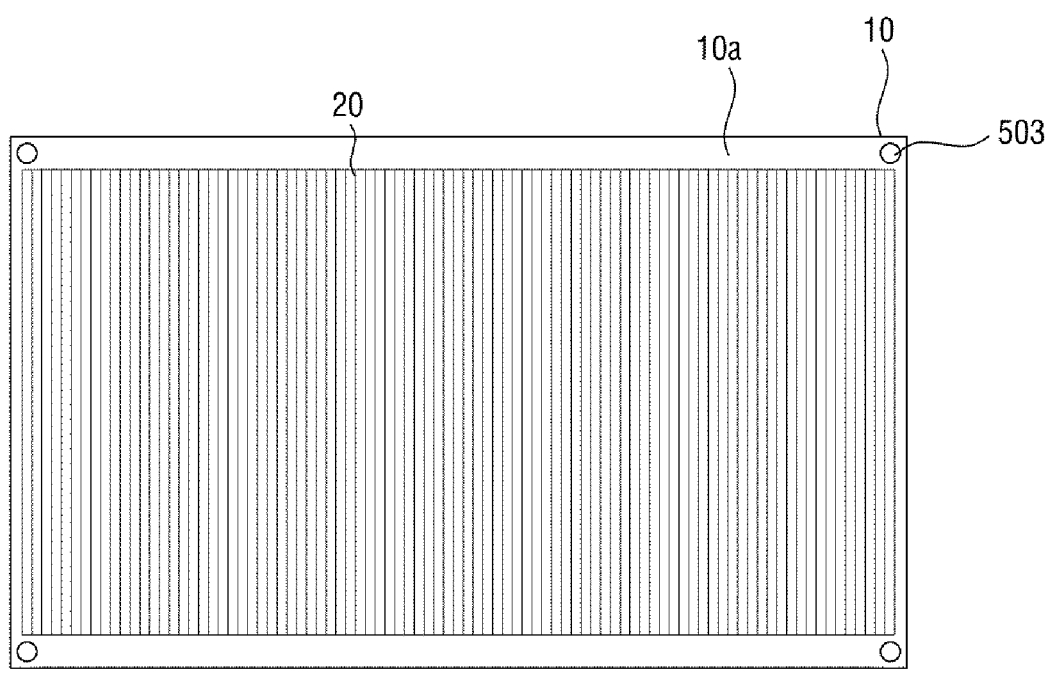
Figure 6:
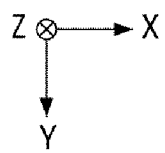

FIGS. 4 to 6 are top plan views of modifications of the relationship between an optical member and an inter-module fixing member of a display device, according to the invention. The exemplary embodiments of FIGS. 4 to 6 illustrate that the layout and shape of inter-module fixing member within a display device may be variously modified.

FIG. 4 illustrates that an inter-module fixing member 501 may be arranged in plurality at more than one side of a light guide member 200. That is, unlike the exemplary embodiment of FIG. 3 where one inter-module 500 is disposed along each of two sides of the optical member 200, two or more inter-module fixing members 501 may be arranged at one or more sides.

FIG. 4 illustrates a case where two inter-module fixing members 501 are disposed along both short sides, respectively. However, the number of inter-module fixing members is not limited thereto, and three or more inter-module fixing members may be arranged at one or more sides of the optical member 200.

When two or more inter-module fixing members 501 are disposed for each side, the balance and coupling between the light guide plate 10 and the display panel 1000 may be more easily maintained. Specifically, when one inter-module fixing member is disposed at a single side of the light guide plate 10, the center of gravity of the display panel 1000 may be biased toward one side according to the position of the inter-module fixing member. When the display panel 1000 loses its center of gravity, the display panel 1000 may be inclined toward the optical member 200, such that the display panel 1000 and the optical member 200 may be in direct contact with each other, so that, as described above, cracks may occur, or the display panel 1000 and/or the optical member 2000 may be split. In contrast, when a plurality of inter-module fixing members are arranged at a single side of the optical member 200, even if any one inter-module fixing member is biased, other inter-module fixing members still support the display panel 1000, so that the center of gravity of the display panel 1000 does not incline the display panel 1000 toward the optical member 200.

FIG. 5 illustrates that an inter-module fixing member 502 may be provided in plurality respectively disposed at corners of the light guide plate 10 within the optical member 200. The exemplary embodiment of FIG. 5 is different from the exemplary embodiment of FIG. 3 where the inter-module fixing members are arranged along sides of the light guide plate 10. When the inter-module fixing members 502 are arranged at the corners of the light guide plate 10, similarly to the case of the inter-module fixing members 501 of FIG. 4, the balance between the light guide plate 10 and the display panel 1000 may be easily adjusted.

Moreover, the inter-module fixing member 502 may be smaller in overall size than the inter-module fixing member 500 of FIG. 3. The balance between the light guide plate 10 and the display panel 1000 may be maintained by increasing the number of inter-module fixing members 502 having the smaller size instead of reducing the size of the inter-module fixing member 502 and arranging the inter-module fixing members at the corners in a balanced manner. As the size of the inter-module fixing member 502 decreases, the influence on the light guiding function and light path of the light guide plate 10 can be minimized, and thus the luminance uniformity may increase. Additionally, with the inter-module fixing member 502 at the corners, an overall area for the first optical pattern 20 may be maximized along the first direction X.

FIG. 6 illustrates that an inter-module fixing member 503 may have a planar shape other than a square shape illustrated in FIG. 5. Although FIG. 6 illustrates a case where the inter-module fixing member 503 has a circular shape in a top plan view, the invention is not limited thereto.

The inter-module fixing member 503 may have a three-dimensionally cylindrical shape. In an exemplary embodiment, for example, inter-module fixing member 503 may be made by disposing a silicon material into a mold and then hardening this material. In this case, since the silicon material may be more easily separated from the mold when the inter-module fixing member 503 is formed to have a circular shape instead of an angled shape, the inter-module fixing member 503 having the cylindrical shape may be easily manufactured.

Figure 7:
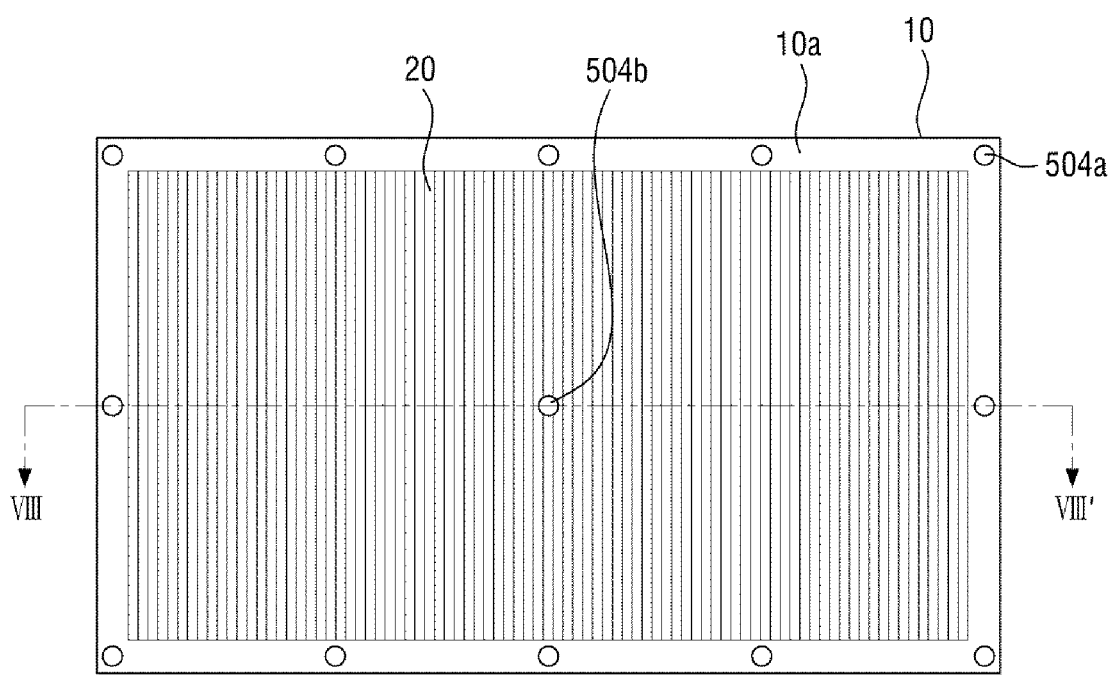
FIG. 7 is a top plan view of another exemplary embodiment of an inter-module fixing member of a display device, according to the invention.
Figure 8:
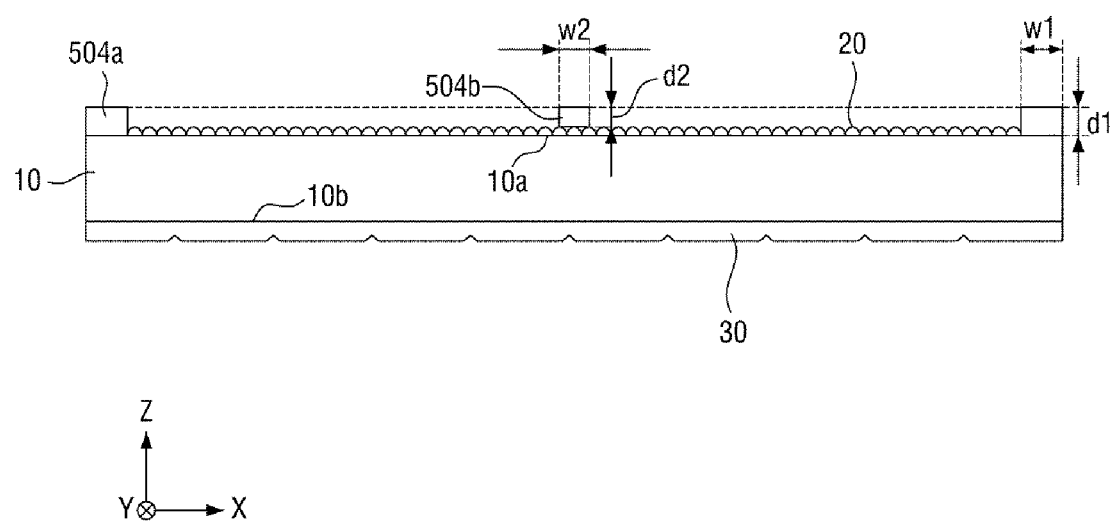
FIG. 8 is a cross-sectional view taken along line of FIG. 7.

FIG. 7 is a top plan view of another exemplary embodiment of an inter-module fixing member of a display device, according to the invention. FIG. 8 is a cross-sectional view taken along line VIII-VIII' of FIG. 7.

Referring to FIGS. 7 and 8, an inter-module fixing member is provided in plurality including a first inter-module fixing member 504a provided in plurality each not overlapping the first optical pattern 20 and one or more of a second inter-module fixing member 504b overlapping the first optical pattern 20.

Each of the first inter-module fixing member 504a and the second inter-module fixing member 504b may have a cylindrical shape having a planar circular shape.

The second inter-module fixing member 504b may be disposed on the first optical pattern 20. The second inter-module fixing member 504b supports the central portion of the display panel 1000. When the size of the display panel 1000 increases as the display device 1 increases in size, the central portion of the display panel 1000 may bend or warp in the gravitational direction (e.g., direction opposite to the third direction Z). When the central portion of the display panel 1000 is not supported by a separate support member or the like, the display panel 1000 may be in direct contact with the optical member 200. In this case, as described above, cracks and splitting phenomena may occur due to direct impact and friction between the display panel 1000 and the optical member 200. The module fixing member 504b is disposed at the central portion of the optical member 200 to reduce or effectively prevent the display panel 1000 from being warped by gravity and to reduce or effectively prevent the direct impact and friction between the optical member 200 and the display panel 1000.

The lower surface of the second inter-module fixing member 504b may be in direct contact with the first optical pattern 20. The second inter-module fixing member 504b may have a refractive index similar to that of the first optical pattern 20. In this case, the influence of the second inter-module fixing member 504b on the function of the first optical pattern 20 and the path of light can be minimized.

The size of the second inter-module fixing member 504b may be smaller than that of the first inter-module fixing member 504a. The size of the second inter-module fixing member 504b may be determined in consideration of the difference that the second inter-module fixing member 504b, unlike the first inter-module fixing member 504a, is disposed on the first optical pattern 20. Specifically, the upper surfaces of the first inter-module fixing member 504a and the second inter-module fixing member 504b are aligned on substantially the same plane (dotted line in FIG. 8), so that the display panel 1000 can be supported and fixed more uniformly.

In this respect, the height d2 of the second inter-module fixing member 504b may be smaller than the height d1 of the first inter-module fixing member 504a. That is, since the second inter-module fixing member 504b is disposed on the first optical pattern 20, the height d2 of the second inter-module fixing member 504b may be a value obtained by subtracting the height of the first optical pattern 20 from the height d1 the first inter-module fixing member 504a.

In addition, the width w2 of the second inter-module fixing member 504b may be smaller than the width w1 of the first inter-module fixing member 504a. The second inter-module fixing member 504b is disposed to overlap the first optical pattern 20, so that the function of the first optical pattern 20 and the influence of the light path on the path may be more direct, as compared with the first inter-module fixing member 504a. Accordingly, the influence of the function of the first optical pattern 20 and the path of light can be minimized by the width w2 of the second inter-module fixing member 504b being smaller than the width w1 of the first inter-module fixing member 504a.

Figure 9:
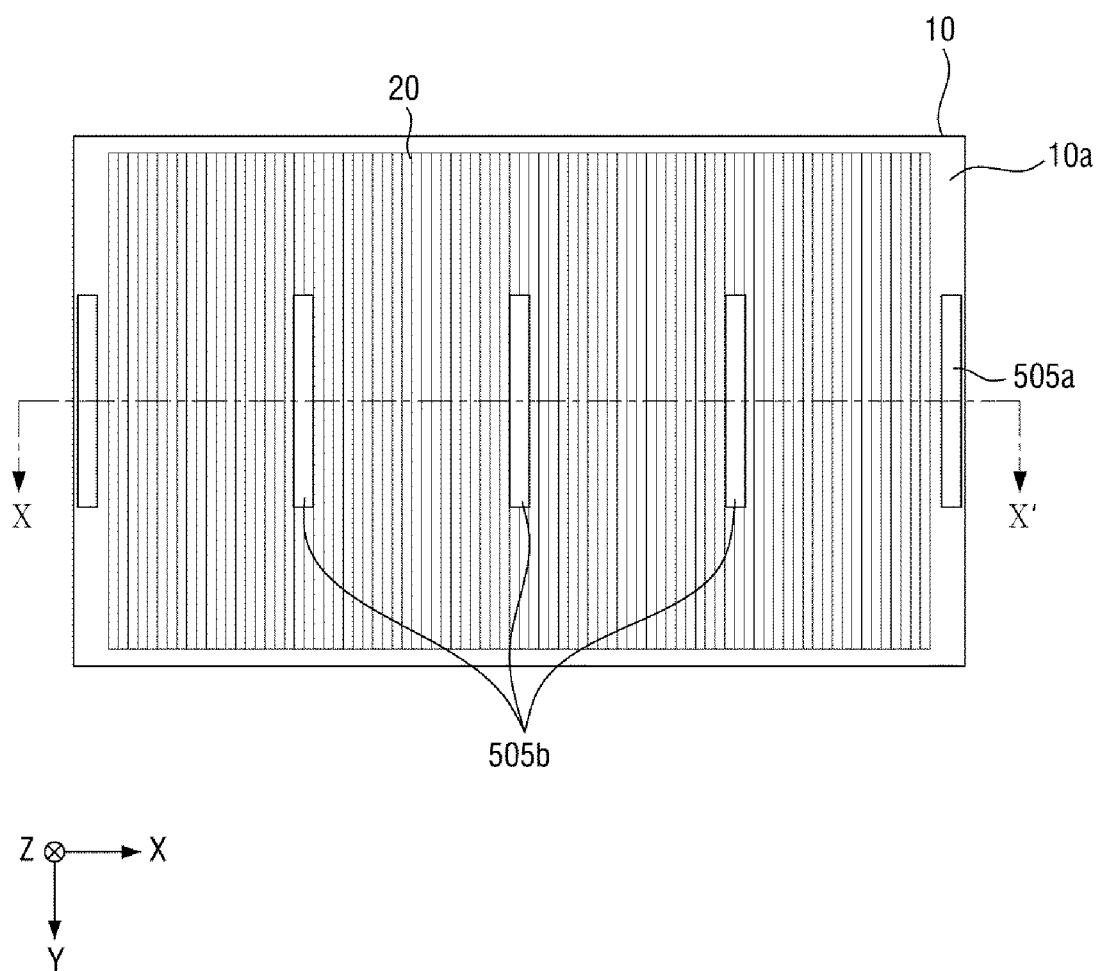
FIG. 9 is a top plan view of still another exemplary embodiment of an inter-module fixing member of a display device, according to the invention.
Figure 10:
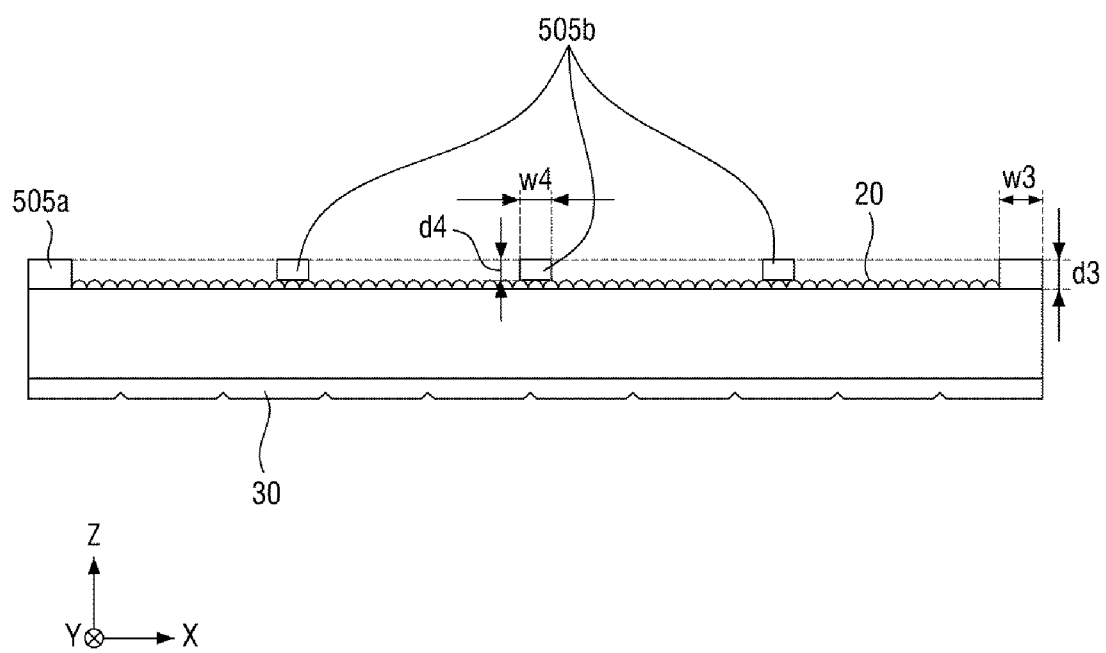
FIG. 10 is a cross-sectional view taken along line X-X' of FIG. 9.

FIG. 9 is a top plan view of still another exemplary embodiment of an inter-module fixing member of a display device, according to the invention. FIG. 10 is a cross-sectional view taken along line X-X' of FIG. 9.

Referring to FIGS. 9 and 10, an inter-module fixing member is different from the inter-module fixing member of FIG. 8 in that the inter-module fixing member has a square pillar shape having a rectangular shape in a top plan view.

The inter-module fixing member is provided in plurality including a third inter-module fixing member 505a provided in plurality and a fourth inter-module fixing member 505b provided in plurality. The third inter-module fixing members 505a may not overlap the first optical pattern 20. The third inter-module fixing members 505a may be disposed at each of both short sides 10S2 and 10S4 which are adjacent to the light incident surface 10S1 of the light guide plate 10. The third inter-module fixing member 505a may have the same shape as the inter-module fixing member 500 according to the exemplary embodiment of FIG. 3.

The fourth inter-module fixing members 505b may be disposed on the first optical pattern 20. The fourth inter-module fixing members 505b may be disposed to be in direct contact with the first optical pattern 20.

The fourth inter-module fixing member 505b may have a line or bar shape lengthwise extending in the same direction as lengths of patterns within the first optical pattern 20. That is, the fourth inter-module fixing member 505b may have a rectangular parallelepiped having relatively long sides lengthwise arranged along the second direction Y.

When the fourth inter-module fixing member 505b lengthwise extends in the same direction as patterns defining the first optical pattern 20, the influence of the fourth inter-module fixing members 505b on the light collecting function can be minimized. Specifically, as described above, the first optical pattern 20 has a lenticular shape extending from the light incident surface 10S1 toward the light-facing surface 10S3, and may correct the path of light so as to refract the light traveling toward sides 10S2 and 10S4 which extend from the light incident surface 10S1 to be directed toward the light-facing surface 10S3. When the module fixing member 505b, like the first optical pattern 20, extends from the light incident surface 10S1 toward the light-facing surface 10S3, the fourth inter-module fixing member 505b may also perform a part of the light collecting function. Further, since the fourth inter-module fixing member 505b has a refractive index similar to that of the first optical pattern 20, an optical interface may not be formed between the fourth inter-module fixing member 505b and the first optical pattern 20. Thus, the light recognizes the first optical pattern 20 and the fourth inter-module fixing member 505b as one pattern, so that the first optical pattern 20 can maintain the light collecting function.

The size of the fourth inter-module fixing member 505b may be smaller than that of the third inter-module fixing member 505a in consideration of the fact that the fourth inter-module fixing member 505b is also disposed on the first optical pattern 20. That is, the height d4 of the fourth inter-module fixing member 505b may be smaller than the height d3 of the third inter-module fixing member 505a. Further, the width w4 of the fourth inter-module fixing member 505b may be smaller than the width w3 of the third inter-module fixing member 505a.

Figure 11:
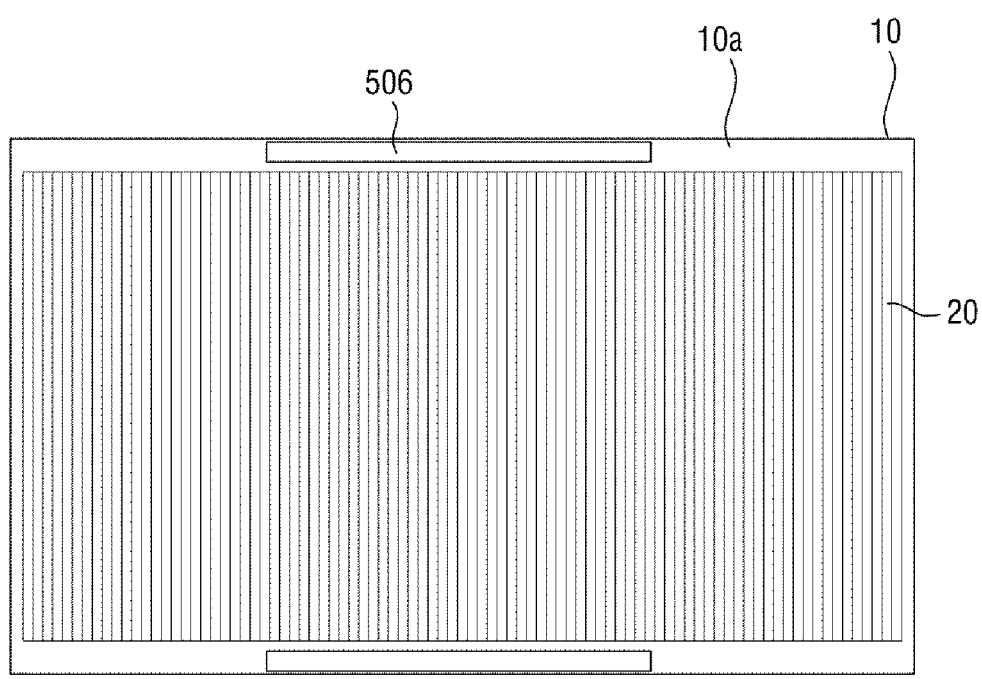
FIG. 11 is a top plan view of yet another exemplary embodiment of an inter-module fixing member of a display device, according to the invention.

FIG. 11 is a top plan view of yet another exemplary embodiment of an inter-module fixing member of a display device, according to the invention.

Referring to FIG. 11, an inter-module fixing member 506 may be provided in plurality respectively disposed at the light incident surface 10S1 and the light-facing surface 10S3 of the light guide plate 10.

In an exemplary embodiment, the refractive index of the inter-module fixing member 506 disposed at the light incident surface 10Ss1 may be lower than the refractive index of the light guide plate 10. More specifically, effective total internal reflection is performed by the upper surface 10a of the light guide plate 10 in order for the light guide plate 10 to efficiently guide light from the light incident surface 10S1 toward the light-facing surface 10S3. One of the conditions under which total internal reflection can be performed in the light guide plate 10 is that the refractive index of the light guide plate 10 is larger than the refractive index of a medium that forms an optical interface with the light guide plate 10. As the refractive index of the medium forming the optical interface with the light guide plate 10 decreases, the critical angle of total reflection decreases, so that total internal reflection can be more frequently performed. In this respect, the refractive index of the inter-module fixing member 506 at the light incident surface 10S1 and the light-facing surface 10S3 may be made smaller than the refractive index of the light guide plate 10, thereby forming an effective optical interface with the light guide plate 10.

In another exemplary embodiment, the inter-module fixing member 506 disposed at the light incident surface 10S1 may have or be formed in a relatively dark color such as black. In this case, the inter-module fixing member 506 can perform a light transmission blocking function at the light incident surface 10S1 and the light-facing surface 10S3. The amount of light emission near the light incident surface 10S1 of the light guide plate 10 may be larger than that of other areas. Thus, the inter-module fixing member 506 having a dark color may be disposed on the side of the light incident surface 10S1 to block light and reduce or effectively prevent leakage thereof.

FIGS. 12A and 12B are top plan views of yet another exemplary embodiment of an inter-module fixing member of a display device, according to the invention.

Referring to FIGS. 12A and 12B, it is illustrated that each of a plurality of an inter-module fixing member 507 may be disposed on the first optical pattern 20.

Each of an end surface and a side surface of the first optical pattern 20 may be substantially aligned with a respective side surface 10S of the light guide plate 10 and/or the optical member 200. That is, the first optical pattern 20 may not expose any portion of the upper surface 10a of the light guide plate 10. However, the invention is not limited thereto, and a portion of the upper surface 10a of the light guide plate 10 may be exposed from the first optical pattern 20 as discussed above. In an exemplary embodiment, even where a portion of the upper surface 10a of the light guide plate 10 may be exposed from the first optical pattern 20, a planar dimension of the exposed portion may be smaller than that of the inter-module fixing member 507 such that the inter-module fixing member 507 may still overlap the first optical pattern 20. Even where a portion of the upper surface 10a of the light guide plate 10 may be exposed from the first optical pattern 20, a total area of the first optical pattern may be enlarged to increase the light collecting function of the first optical pattern 20.

The inter-module fixing members 507 may be fixed to the first optical pattern 20 such as through an adhesive member 70. The adhesive member 70 may include or be made of the same material as the first optical pattern 20. In an exemplary embodiment, for example, when the first optical pattern 20 is formed by an imprinting method using a resin disposed on a main body of the light guide plate 10, the adhesive member 70 may be made of the same resin as the resin used in forming the first optical pattern 20.

When the adhesive member 70 and the first optical pattern 20 include or are made of the same material, the influence of the adhesive member 70 on the light collecting function of the first optical pattern 20 can be minimized.

As described above, according to one or more exemplary embodiment of the optical member of a display device, the inter-module fixing member may overlap the optical member in a top plan view, such that the display panel and the optical member can be fixed relative to each other and to other components of the display device, solely by the inter-module fixing member without increasing the bezel of the display device. Further, the inter-module fixing member serves as a buffer for absorbing an external impact to the display device, so that the durability of the display device can be improved.

The effects of the invention are not limited by the foregoing, and other various effects are anticipated herein.

Although exemplary embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A display device, comprising:
a display panel which displays an image with light;
an optical member which provides the light to the display panel; and
an elastic inter-module fixing member disposed between the display panel and the optical member and overlapping the optical member in a top plan view,
wherein a friction coefficient of the inter-module fixing member with respect to each of the display panel and the optical member is larger than a friction coefficient of the display panel with respect to the optical member, to fix positions of the display panel and the optical member solely by the inter-module fixing member therebetween.

2. The display device of claim 1, wherein the inter-module fixing member includes a silicon material or a rubber material.

3. The display device of claim 1, wherein the optical member includes:
a first optical pattern through which the light is provided from the optical member to the display panel, and
a light guide plate through which light incident thereto is guided and from which the guided light is provided to the first optical pattern, the first optical pattern disposed between the light guide plate and the display panel.

4. The display device of claim 3, wherein the inter-module fixing member is disposed overlapping the first optical pattern.

5. The display device of claim 4, further comprising:
an adhesive member disposed between the inter-module fixing member and the first optical pattern to fix the inter-module fixing member disposed overlapping the first optical pattern to the first optical pattern,
wherein the adhesive member is formed from a same material as the first optical pattern.

6. The display device of claim 3, wherein
the light guide plate includes an upper surface facing the display panel with the first optical pattern therebetween, and in the top plan view, the upper surface of the light guide plate extends further than edges of the first optical pattern.

7. The display device of claim 6, wherein the first optical pattern is a lenticular pattern.

8. The display device of claim 6, wherein a refractive index of the inter-module fixing member is substantially equal to a refractive index of the first optical pattern.

9. The display device of claim 6, wherein
a portion of the upper surface of the light guide plate which is extended further from the edges of the first optical pattern is exposed from the first optical pattern, and
the inter-module fixing member is disposed on the exposed portion of the upper surface of the light guide plate.

10. The display device of claim 9, wherein the inter-module fixing member is in direct contact with each of the display panel and the exposed portion of the upper surface of the light guide plate.

11. The display device of claim 6, wherein
a portion of the upper surface of the light guide plate which is extended further from the edges of the first optical pattern is exposed from the first optical pattern, and
the inter-module fixing member is provided in plurality and includes:
a first inter-module fixing member disposed on the exposed portion of the upper surface of the light guide plate, and
a second inter-module fixing member disposed overlapping the first optical pattern.

12. The display device of claim 11, wherein the second inter-module fixing member disposed overlapping the first optical pattern has a polygonal columnar shape lengthwise extending in a same direction as a length of the first optical pattern.

13. The display device of claim 11, wherein along a thickness of the display device in cross-section, a height of the first inter-module fixing member disposed on the exposed portion of the upper surface of the light guide plate is larger than a height of the second inter-module fixing member disposed overlapping the first optical pattern.

14. A display device, comprising:
a display panel which displays an image with light;
a light guide plate through which light incident thereto is guided and from which the guided light is provided to the display panel, the light guide plate including:
a light incident side surface through which the light is incident to the light guide plate, and
a connecting side surface which is connected to and extends from the light incident side surface;
a first optical pattern through which the guided light from the light guide plate is provided to the display panel, the first optical pattern disposed between the display panel and the light guide plate; and
an inter-module fixing member disposed between the display panel and the light guide plate, solely by which positions of the display panel and the light guide plate are fixed,
wherein the inter-module fixing member solely by which the positions of the display panel and the light guide plate are fixed includes a silicon material or a rubber material.

15. The display device of claim 14, wherein the inter-module fixing member is disposed adjacent to the connecting side surface of the light guide plate.

16. The display device of claim 15, wherein the inter-module fixing member disposed adjacent to the connecting side surface of the light guide plate includes a transparent material.

17. The display device of claim 14, wherein the inter-module fixing member is disposed adjacent to the light incident surface of the light guide plate.

18. The display device of claim 17, wherein the inter-module fixing member disposed adjacent to the light incident surface of the light guide plate has a black color.

19. The display device of claim 17, wherein a refractive index of the inter-module fixing member disposed adjacent to the light incident surface of the light guide plate is lower than a refractive index of the light guide plate.

20. The display device of claim 17, wherein the inter-module fixing member disposed adjacent to the light incident surface of the light guide plate is disposed at corners of the light guide plate located at opposing ends of the light incident surface.

* * * * *